US008117416B2

(12) United States Patent
Shiga et al.

(10) Patent No.: US 8,117,416 B2
(45) Date of Patent: Feb. 14, 2012

(54) STORAGE DEVICE AND POWER CONTROL METHOD

(75) Inventors: Kenta Shiga, Yokohama (JP); Norihiko Kawakami, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 656 days.

(21) Appl. No.: 12/207,979

(22) Filed: Sep. 10, 2008

(65) Prior Publication Data

US 2010/0005261 A1 Jan. 7, 2010

(30) Foreign Application Priority Data

Jul. 4, 2008 (JP) .................................. 2008-175866

(51) Int. Cl.
*G06F 12/00* (2006.01)
(52) U.S. Cl. ........ 711/170; 711/154; 711/161; 711/162; 711/163
(58) Field of Classification Search .................. 711/154, 711/161, 162, 163, 170
See application file for complete search history.

(56) References Cited

U.S. PATENT DOCUMENTS

2009/0235269 A1* 9/2009 Nakajima et al. ............. 718/104
2009/0254701 A1* 10/2009 Kurokawa et al. ............ 711/112

FOREIGN PATENT DOCUMENTS

JP 2007-219703 8/2007

* cited by examiner

*Primary Examiner* — Midys Rojas
(74) *Attorney, Agent, or Firm* — Brundidge, & Stanger, P.C.

(57) ABSTRACT

The storage device of the present invention has: a first recording unit that records a time zone history of access to each storage area assigned to a virtual volume; a second recording unit that executes a predetermined calculation based on the time zone history of access to a plurality of storage areas belonging to a plurality of pool areas and records the calculation result for each of the plurality of pool areas; a comparison unit that acquires, from the first recording unit, the time zone history of access to an optional storage area among the plurality of storage areas and compares the acquired access time zone history with the calculation result recorded in the second recording unit; and a migration unit that selects, from among the plurality of pool areas, a pool area for which the calculation result is similar to the acquired access time zone history on the basis of the result of the comparison by the comparison unit, and migrates the data stored in the optional storage area to a storage area in the selected pool area.

14 Claims, 17 Drawing Sheets

FIG. 4

| HDD ID | STATE |
|--------|--------|
| H00 | IN USE |
| ... | ... |
| H08 | UNUSED |
| ... | ... |

HDD TABLE 12

FIG. 5

| RG ID | HDD ID | STATE |
|-------|--------|-------|
| RG00 | H00, H01, H02, H03 | SPINUP |
| RG01 | H04, H05, H06, H07 | SPINDOWN |
| ... | ... | ... |

RAID GROUP TABLE 13

FIG. 6

| R ID | SIZE | RG ID | LAST ACCESS TIME | STATE |
|---|---|---|---|---|
| R00 | 3TB | RG00 | 2008/04/01 12:00 | SPINDOWN-INCAPABLE |
| R01 | 3TB | RG01 | 2008/01/01 00:00 | SPINDOWN-CAPABLE |
| ... | ... | ... | ... | ... |

REAL VOLUME TABLE 14

FIG. 7

| P ID | R ID | ACCESS HISTORY SUMMARY |
|---|---|---|
| P00 | RG00 | 000000000000 |
| P01 | RG01 | 111100000000 |
| ... | ... | ... |

POOL TABLE 15

REAL VOLUME TABLE 16

MAPPING TABLE 17

| R ID | REAL PAGE NO | STATE | ACCESS COUNTER | ACCESS HISTORY |
|------|--------------|--------|----------------|----------------|
| R00 | RP00 | IN USE | 32 | 000000000000 |
| R00 | RP01 | IN USE | 16 | 000000000000 |
| R00 | RP02 | IN USE | 16 | 000000000000 |
| ... | ... | ... | ... | ... |
| R01 | RP00 | IN USE | 0 | 110100000000 |
| R01 | RP01 | UNUSED | NULL | NULL |
| ... | ... | ... | ... | ... |

PAGE TABLE 18

FIG. 16

| | POOL CREATION SCREEN | S1 |

POOL ID _____ A1

REAL VOLUMES: R00, R01, ... A2

ACCESS HISTORY SUMMARY

| TIME ZONE | ACCESS | NO ACCESS |
|---|---|---|
| 0:00 TO 02:00 | ○ RB | ● |
| 02:00 TO 04:00 | ○ | ● |
| 04:00 TO 06:00 | ○ | ● |
| 06:00 TO 08:00 | ● | ○ |
| 08:00 TO 10:00 | ● | ○ |
| 10:00 TO 12:00 | ● | ○ |
| 12:00 TO 14:00 | ● | ○ |
| 14:00 TO 16:00 | ● | ○ |
| 16:00 TO 18:00 | ● | ○ |
| 18:00 TO 20:00 | ○ | ● |
| 20:00 TO 22:00 | ○ | ● |
| 22:00 TO 0:00 | ○ | ● |

OK (B1)    CANCEL (B2)

STORAGE DEVICE AND POWER CONTROL METHOD

CROSS-REFERENCE TO PRIOR APPLICATION

This application relates to and claims the benefit of priority from Japanese Patent Application number 2008-175866, filed on Jul. 7, 2008, the entire disclosure of which is incorporated herein by reference.

BACKGROUND

The present invention generally relates to a storage device and a power control method, and is particularly applied to a storage device requiring a reduction in power consumption.

Storage devices contain a plurality of hard disk drives (referred to as a 'hard disk drive group' hereinbelow) and are devices in which the hard disk drive group is managed using the RAID (Redundant Array of Independent/Inexpensive Disks) system.

A hard disk drive group stores files compiling a plurality of data and backup data of a plurality of data and so forth, there being time zones in which the storage device does not access the hard disk drive group storing the files and the backup data and so forth depending on the administrator using the data and the content of the data.

Japanese Laid-Open Patent Publication No. 2007-219703 discloses a technology according to which the storage device classifies the data in accordance with the time interval from the point where the data is accessed until the data is accessed the next time, data for which the time interval is long that is not frequently accessed is moved from a high-performance and high-cost hard disk drive to a low-cost hard disk drive of a large capacity, and the rotation of the low-cost hard disk drive of a large capacity is stopped. According to Japanese Laid-Open Patent Publication No. 2007-219703, because the rotation of the low-cost hard disk drive of a large capacity that stores the classified data is stopped, energy savings can be obtained.

SUMMARY

According to the technology of Japanese Laid-Open Patent Publication No. 2007-219703, data is classified by the access time interval and therefore optional data accessed at 05:00 and accessed at 10:00 after five hours and other data accessed at 08:00 and accessed at 13:00 after five hours, for example, have the same five-hour access time interval and are therefore migrated to the same hard disk drive. Hence, although the storage device stops the migrated hard disk drive, in order to cater to access at 05:00, 08:00, 10:00, and 13:00, the stopped hard disk drive must be restarted at these times. In cases where a plurality of data is migrated to a low-cost hard disk drive of a large capacity, the storage device must control the frequency of the stoppage or startup of the hard disk drive. Thus, the problem arises that, when data is classified in accordance with the access-time time interval, there are also cases where the storage device must frequently start up or stop the hard disk, and the power consumption cannot be adequately reduced.

Therefore, the present invention proposes a storage device and power control method capable of reducing the power consumption of the storage device by performing grouping using data with similar temporal access patterns.

In order to solve this problem, the present invention comprises a virtual volume that provides a virtual storage area for a host device; a plurality of pool areas each having a plurality of storage areas assigned to the virtual volume on the basis of access by the host device to the virtual volume; a first recording unit that records a time zone history of access to each storage area assigned to the virtual volume; a second recording unit that executes a predetermined calculation based on the time zone history of access to the plurality of storage areas belonging to the plurality of pool areas respectively and records the calculation result for each of the plurality of pool areas; a comparison unit that acquires, from the first recording unit, the time zone history of access to an optional storage area among the plurality of storage areas and compares the acquired access time zone history with the calculation result recorded in the second recording unit; and a migration unit that selects, from among the plurality of pool areas, a pool area for which the calculation result is similar to the acquired access time zone history on the basis of the result of the comparison by the comparison unit, and migrates the data stored in the optional storage area to a storage area in the selected pool area.

As a result, data with similar temporal access patterns can be grouped by pool areas.

Furthermore, the present invention comprises a plurality of volumes providing a storage area for access by a host device; a plurality of volume groups constituted by groups of the plurality of volumes; a first recording unit that records a time zone history of access to the volumes; a second recording unit that executes a predetermined calculation on the basis of the time zone history of access to the volumes belonging to the volume groups and records the calculation result for each of the volume groups; a comparison unit that acquires, from the first recording unit, the time zone history of access to an optional volume and compares the acquired access time zone history with the calculation result recorded in the second recording unit; and a migration unit that selects, from among the volume groups, a volume group for which the calculation result tends to be similar to the acquired access time zone history on the basis of the result of the comparison by the comparison unit, and migrates the data stored in the optional volume to a volume of the selected volume group.

As a result, data with similar temporal access patterns can be grouped by pool areas.

In addition, the present invention is a power control method of a storage device having: a virtual volume providing a virtual storage area for access by a host device; and a plurality of pool areas each having a plurality of storage areas assigned to the virtual volume on the basis of the access by the host device to the virtual volume, the power control method comprising the steps of: recording a time zone history of access to each storage area assigned to the virtual volume in a first recording unit; executing a predetermined calculation based on the time zone history of access to the plurality of storage areas belonging to the plurality of pool areas respectively and recording the calculation result in a second recording unit for each of the plurality of pool areas; acquiring, from the first recording unit, the time zone history of access to an optional storage area among the plurality of storage areas, and comparing, by means of a comparison unit, the acquired access time zone history with the calculation result recorded in the second recording unit; and selecting, from among the plurality of pool areas, a pool area for which the calculation result is similar to the acquired access time zone history on the basis of the result of the comparison by the comparison unit, and migrating the data stored in the optional storage area to a storage area in the selected pool area.

As a result, data with similar temporal access patterns can be grouped by pool areas.

Moreover, the present invention comprises the steps of constituting a plurality of volume groups by means of groups of a plurality of volumes providing a storage area for access by a host device; recording a time zone history of access to the volumes in a first recording unit; executing a predetermined calculation based on the time zone history of access to the volumes belonging to the volume groups and recording the calculation result in a second recording unit for each of the volume groups; acquiring, from the first recording unit, the time zone history of access to an optional volume and comparing, by means of a comparison unit, the acquired access time zone history with the calculation result recorded in the second recording unit; and selecting, from among the volume groups, a volume group for which the calculation result tends to be similar to the acquired access time zone history on the basis of the result of the comparison by the comparison unit, and migrating the data stored in the optional volume to a volume of the selected volume group.

As a result, data with similar temporal access patterns can be grouped by pool areas.

BRIEF DESCRIPTION OF THE DRAWINGS

FIG. 4 shows a hard disk drive table of the embodiment;

FIG. 5 shows a RAID group table of the embodiment;

FIG. 6 shows a real volume table of the embodiment;

FIG. 7 shows a pool table of the embodiment;

FIG. 16 shows a screen with which the administrator instructs the creation of a pool according to the embodiment;

DESCRIPTION OF THE PREFERRED EMBODIMENTS

An embodiment of the present invention will be described in detail hereinbelow with reference to the drawings.

(1) Constitution of Storage System

Figure 1:
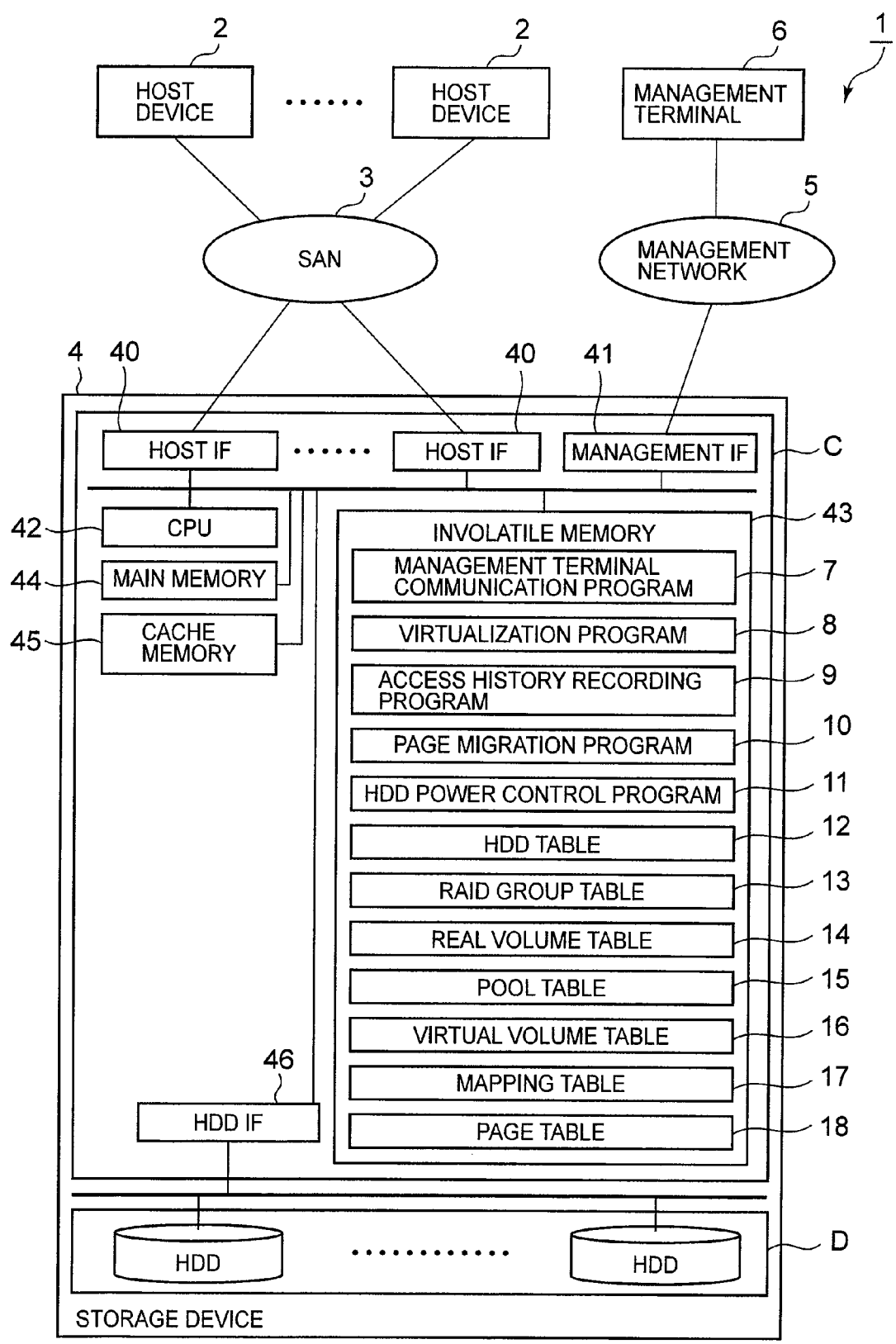
FIG. 1 is a block diagram showing the constitution of a storage system of an embodiment.

In FIG. 1, 1 denotes the whole storage system of the embodiment. The storage system is constituted such that a host device 2 is connected to a storage device 4 via a SAN 3 (Storage Area Network) and storage device 4 is connected to a management terminal 6 via a management network 5.

The host device 2 is a computer device comprising information processing resources such as a CPU (not shown) and memory (not shown) and issues data I/O requests to the storage device 4.

Communication between the host device 2 and storage device 4 employs the Fibre channel protocol or iSCSI (internet SCSI).

The storage device 4 is constituted by a drive group D constituted by a plurality of hard disk drives and a controller group C that performs regulation to operate the plurality of hard disk drives using a RAID system.

For the hard disk drives that constitute the drive group, a high access performance, high-cost disk such as an SCSI disk or SSD (Solid State Disk), or a low access performance, low-cost disk such as a SATA disk or optical disk, for example, is employed.

The controller group is constituted by a host interface 40 (abbreviated to 'host IF' in the drawings), a management interface 41 (abbreviated to 'management IF' in the drawings), a CPU 42, an involatile memory 43, a main memory 44, a cache memory 45, and a hard disk drive interface 46 (abbreviated to 'HDD IF' in the drawings).

The host interface 40 sends and receives data and data I/O requests between the host devices 2 and the storage device 4. Further, the management interface 41 sends and receives the information of the storage device 4 between the management terminal 6 and storage device 4.

The CPU 42 controls the inputs and outputs of data as well as information of the storage device 4 sent and received via the interfaces 40 and 41. The CPU 42 also reads various tables and various programs stored in the involatile memory 43 to the main memory 44 and executes the read programs.

The involatile memory 43 is mainly a memory for storing information required to control the storage device 4. The involatile memory 43 stores a management terminal communication program 7 for communicating with the management terminal 6, a virtualization program 8 for assigning a real capacity to a virtual volume, an access history recording program 9 for recording access by the host device 2 as an access time zone history, a page migration program 10 for migrating a page constituting a unit of a real capacity assigned to the virtual volume to a hard disk drive group with similar temporal access patterns, and an HDD power control program 11 for controlling the ON and OFF of the power of the hard disk drive group that saves data that has not been accessed, according to the time zone. 'Access' refers to a write request or read request from the host, or a request to acquire or change another set state from the host, or the like. Furthermore, the involatile memory stores a hard disk drive table 12 (abbreviated to 'HDD table' in the drawings), a RAID group table 13, a real volume table 14, a pool table 15, a virtual volume table 16, a mapping table 17, and a page table 18. A description of various tables is provided subsequently.

The cache memory 45 mainly temporarily stores data that is input and output to and from the storage device 4.

Data is sent and received between the drive group D and controller group C via the hard disk drive interface 46.

Figure 2:
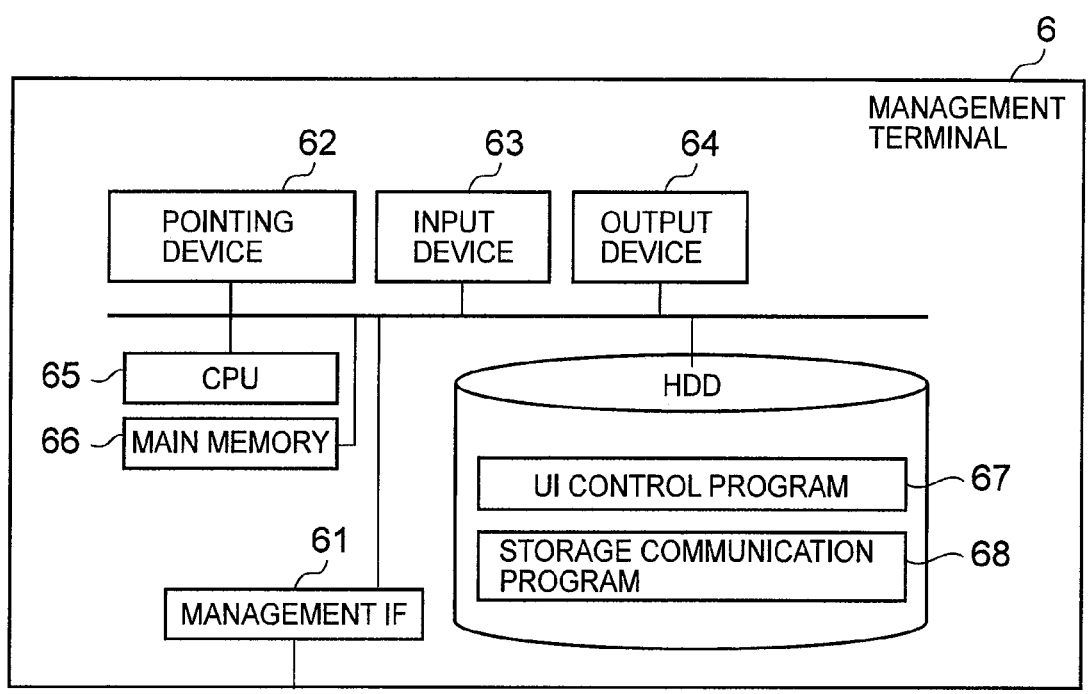
FIG. 2 is a block diagram showing the constitution of a management terminal of the embodiment.

The management terminal 6 is a computer device for managing the operation and state of the storage device 4 via the management network 5. As shown in FIG. 2, the management terminal 6 is constituted by a management interface 61 (abbreviated to 'management IF' in the drawings), a pointing device 62 representing a mouse, an input device 63 indicating a keyboard, an output device 64 representing a screen, a CPU 65, a main memory 66, and a hard disk drive (abbreviated to 'HDD' in the drawings).

Communication is performed between the management terminal 6 and storage device 4 via the management interface 61.

The CPU 65 controls the inputs of a request to acquire information of the storage device 4 which is transmitted to the storage device 4 via the management interface 61 and information of the storage device 4 which is transmitted by the storage device 4 and received by the management terminal 6. In addition, the CPU 65 reads various programs 67 and 68 stored in the hard disk drives to the main memory 66 and executes the programs thus read.

The hard disk drives store a UI (User Interface) control program 67 and a storage communication program 68. The UI control program 67 is a program for displaying the received information of the storage device 4 on the output device 64 and accepting inputs from the input device 63. The storage communication program 68 is a program that allows the management terminal 6 to communicate with the storage device 4. The CPU 42 is capable of receiving information of the storage device 4 via the management interface 61 from the storage device 4 by executing the storage communication program 68.

(2) Logical Constitution of Drive Group

Figure 3:
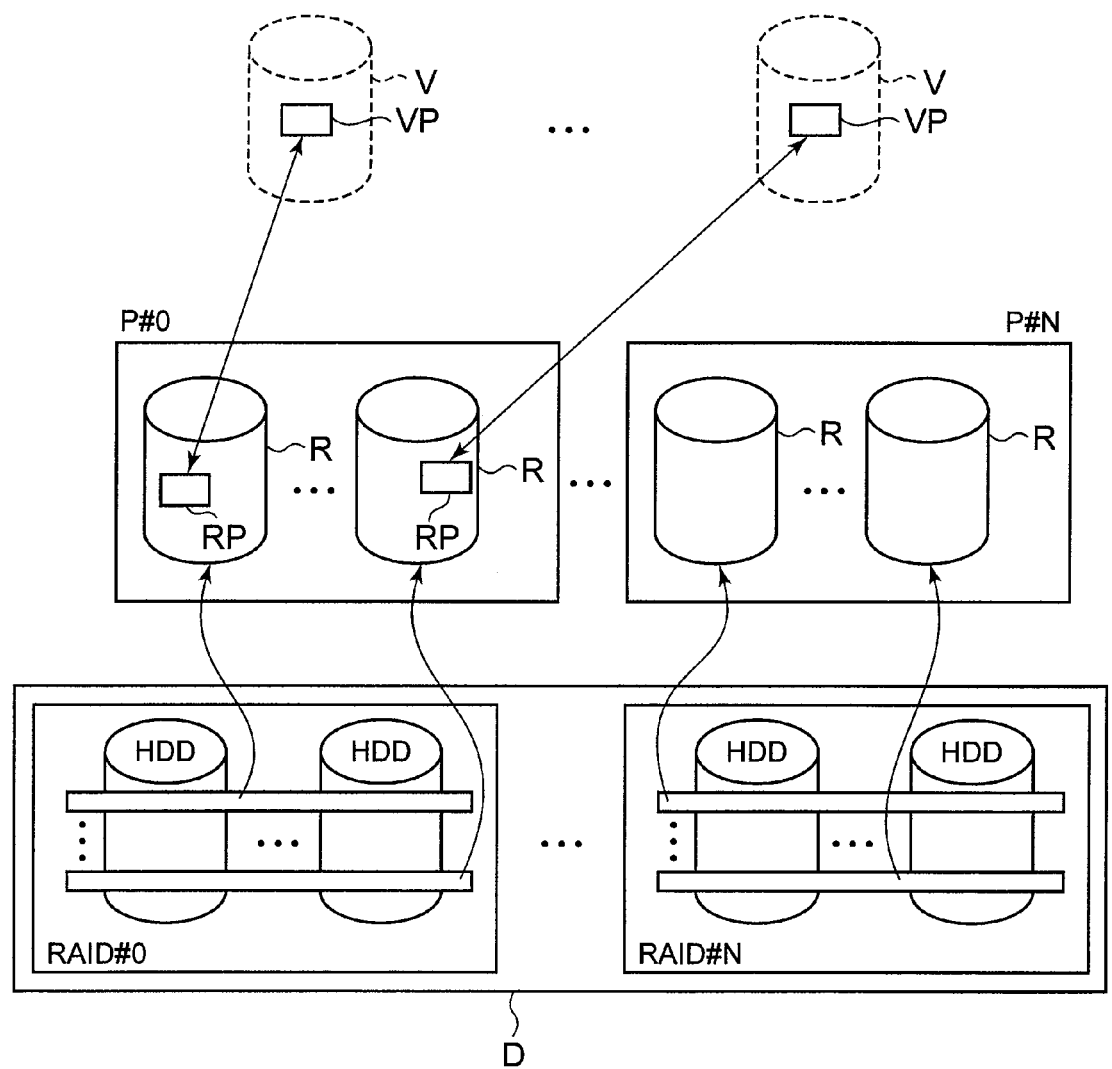
FIG. 3 is an explanatory diagram of the logical constitution of a drive group of the embodiment.

In the storage system 1 of this embodiment, as shown in FIG. 3, one RAID group is constituted by several hard disk drives among a plurality of hard disk drives constituting drive group D. Further, one or more real volumes R are formed on a storage area of one RAID group. A storage area group constituted by one or more real volume groups is known as a pool P. One pool P corresponds to one RAID group or a plurality of RAID groups. Meanwhile, the storage device 4 supplies a virtual storage area that is accessible to the host device 2 (called a 'virtual volume V' hereinbelow) to the host device 2. A virtual volume V is a volume to which real storage capacity is assigned by the real volumes R in pool P when there is a request to write data from host device 2 to the virtual volume V. Thus, the storage area unit in which real storage capacity is assigned to the virtual volume V by a real volume R in pool P is called a 'page'. Therefore, the storage area of real volume R (real page RP) and the storage area of virtual volume V (virtual page VP) are associated with each other in page units.

Thus, because the storage capacity that is actually suitably used is assigned to virtual volume V, the storage capacity of pool P can be effectively utilized without the need to provide the host device with excess storage capacity.

(3) Each Table Stored in Involatile Memory

Each of the tables stored in involatile memory 43 will therefore be described next.

(3-1) Hard Disk Drive Table

The hard disk drive table 12 (abbreviated to 'HDD table' in the drawings) is a table for managing all of the hard disk drives installed in the storage device 4. The hard disk drive table 12 is constituted by the 'HDD ID' field 120 and 'state' field 121 for identifying the hard disk drives. The 'state' field 121 is a field indicating whether the hard disk drives are used in order to constitute a RAID group. For example, in the hard disk drive table 12 shown in FIG. 4, hard disk drive 'H00' is used to constitute a RAID group and, therefore, information such as 'in use' is registered in the 'state' field 121. However, because the hard disk drive 'H08' is not used to constitute a RAID group, information such as 'unused' is registered in the 'state' field 121.

(3-2) RAID Group Table

RAID group table 13 (abbreviated to 'RG table' in the drawings) is a table for managing the operating states of the hard disk drives constituting the RAID groups. The RAID group table 13 is constituted by an 'RG ID' field 130 for identifying the RAID groups, a 'HDD ID' field 131 for identifying the hard disk drives constituting the RAID groups, and a 'state' field 132 indicating whether the hard disk drives are operating in a power saving mode. 'Power saving' refers to power where the power is less than the power normally used when operating a hard disk drive constituting a RAID group, or where the power is zero. For example, it can be seen that, in the RAID group table 13 shown in FIG. 5, the hard disk drives 'H00', 'H01', 'H02' and 'H03' constitute a RAID group 'RG00' and that these hard disk drives are in a 'spinup' state in which same operate under normal rotation. Furthermore, it can be seen that the hard disk drives 'H04', 'H05', 'H06', and 'H07' constitute a RAID group 'RG01' and that these hard disk drives are in a 'spindown' state where they operate in a power saving mode. 'Spindown' denotes a state where a hard disk drive is energized but the rotation of the hard disk drive is stopped. Although only 'spindown' is exemplified for the power saving operation in FIG. 5, there also exist power saving operations such as powering off the whole hard disk drive or reducing the rotational speed (Low RPM) thereof.

(3-3) Real Volume Table

The real volume table 14 is a table for managing the times when the real volumes R are accessed and for managing the power saving operation of the RAID group to which the real volumes R belong. The real volume table 14 is constituted by an 'R ID' field 140 that identifies the real volumes R, a 'size' field 141 indicating the storage capacity of the real volumes R, an 'RG ID' field 142 that identifies the RAID groups to which the real volumes R belong, a 'last access time' field 143 that indicates the last time the real volumes R were accessed, and a 'state' field 144.

The 'state' field 144 is a field indicating whether access to the real volumes R exceeds a predetermined time interval from the last access time and whether a power saving operation for the RAID groups to which the real volumes R belong is possible.

For example, in the real volume table 14 shown in FIG. 6, it can be seen that the last access time when a real volume 'R00' was accessed is '12:00 Apr. 1, 2008' and, because a predetermined time interval has not elapsed since the last access time, it is indicated that the RAID group 'RG00' to which the real volume 'R00' belongs is in a state 'spindown-incapable' where a power saving operation is not possible. Furthermore, it can be seen that the last access time when the real volume 'R01' was accessed is '00:00 Jan. 1, 2008' and, since a predetermined time interval has elapsed since the last access time has elapsed, the RAID group 'RG01' to which the real volume 'R01' belongs is in a state 'spinup-capable' where a power saving operation is possible.

(3-4) Pool Table

The pool table 15 is a table for managing the real volumes R constituting the pools P and for managing collected data for the history of time zones in which the real volumes R are accessed.

The pool table 15 is constituted by a 'P ID' field 150 for identifying the pools P, an 'R ID' field 151 for identifying the real volumes R constituting the pools P, and an 'access history summary' field 152 which collects recordings of whether the real volumes R have been accessed.

In addition, the other real volumes R in the RAID groups RG of the real volumes R assigned to the pools P are not assigned to the other pools P.

The 'access history summary' field 152 indicates, by means of bits, whether the real volumes R constituting the pools P have been accessed at each predetermined time interval. This embodiment shows an access history summary for every two hours. Further, the respective bits correspond to the respective time zones. For example, the lowest-order bit corresponds to 22:00 until 0:00 and the highest-order bit corresponds to 00:00 to 02:00. In this embodiment, in cases where there is access to the real volumes R constituting the pools P every two hours, this is indicated by bit '0' and, in cases where there is no access, this is shown by bit '1'.

For example, the pool table 15 shown in FIG. 7 shows that the real volume 'R01' constituting pool 'P01' has not been accessed in the time zones 0:00 to 2:00, 2:00 to 4:00, 4:00 to 6:00, and 6:00 to 8:00 and that the real volume 'R01' has been accessed in the time zone 8:00 to 0:00. Pool 'P00' is a default pool and pool P to which the real volume 'R00' which is always accessed belongs is created beforehand. When the virtual volume V is created, the storage device 4 assigns a page from the real volume P constituting the default pool.

(3-5) Virtual Volume Table

Figure 8:
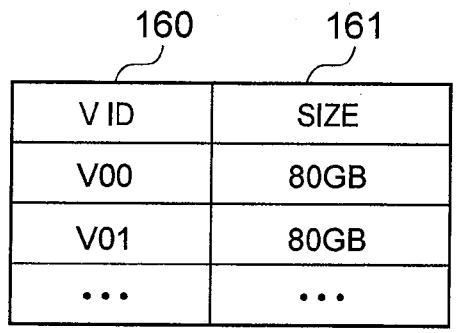
FIG. 8 shows a virtual volume table of the embodiment.

The virtual volume table 16 is a table for managing the quantity and capacity of virtual volumes V. The virtual volume table 16 is constituted by a 'V ID' field 160 for identifying the virtual volumes V and a 'size' field 161 representing the storage capacity of the virtual volume. The storage capacity registered in the 'size' field 161 is supplied virtually to the host device 2. However, a real volume is not assigned by 'size' to the virtual volume. Instead, a real volume of the required capacity is suitably assigned to the virtual volume V in page units during data storage. For example, in the virtual volume table 16 shown in FIG. 8, it can be seen that virtual volumes 'V00' and 'V01' both virtually supply a storage capacity of '80 GB' to the host device 2.

(3-6) Mapping Table

Figure 9:
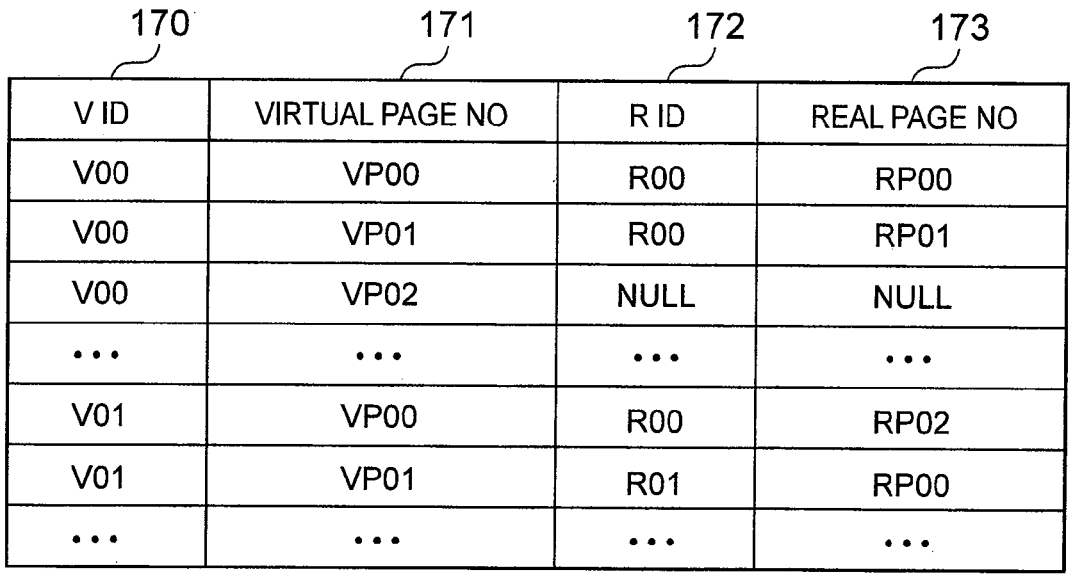
FIG. 9 shows a mapping table of the embodiment.

The mapping table 17 is a table showing the relationship between the virtual volumes V and real volumes R. The mapping table 17 is constituted by a 'V ID' field 170 for identifying the virtual volumes V, a 'virtual page No' field 171 for identifying virtual pages VP of the virtual volumes V, an 'R ID' field 172 for identifying the real volumes R associated with the virtual volumes V, and a 'real page No' field 173 for identifying real pages RP of the real volumes R associated with the virtual pages VP of the virtual volumes V. For example, the mapping table 17 shown in FIG. 9 shows that the virtual page 'VP01' of virtual volume 'V00' is assigned the storage capacity of a real page 'RP01' of the real volume 'R00'. In cases where the actual storage capacity has not been assigned to virtual page VP of virtual volume V, 'null (unassigned)' is registered in the 'R ID' field 172 and 'real page No' field 173 of the real volume R.

(3-7) Page Table

The page table 18 is a table for managing the history of the time zones in which the real pages RP of the real volumes R are accessed. The page table 18 is constituted by an 'R ID' field 180 for identifying the real volumes R, a 'real page No' field 181 for identifying the real pages RP of the real volumes R, a 'state' field 182 for identifying whether the virtual pages VP of the virtual volumes V have been assigned to the real pages RP, an 'access counter' field 183 that counts the number of times the real pages RP are accessed in a predetermined time interval, and an 'access history' field 184 that records, as history, whether the real pages RP have been accessed for each predetermined time interval.

The 'access history' field 184 indicates, using bits, the access history for the real pages RP for each predetermined time interval. In this embodiment, an access history every two hours is shown. The respective bits correspond to the respective time zones. For example, the lowest-order bit corresponds to 22:00 to 0:00 and the highest-order bit corresponds to 0:00 to 02:00.

Figures 10, 11:
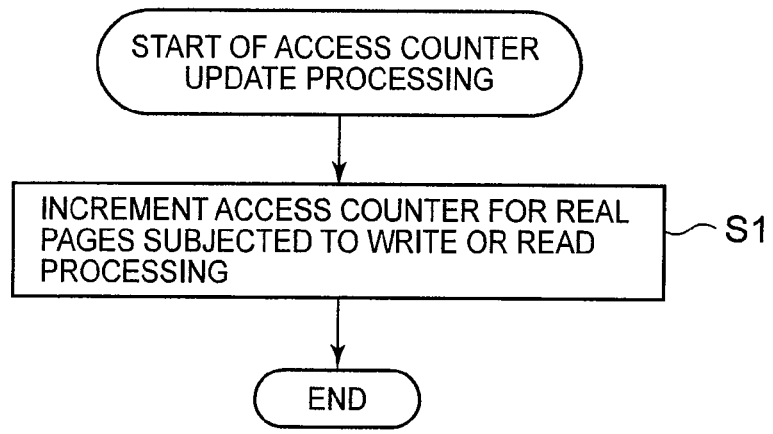
FIG. 10 shows a page table of the embodiment.
FIG. 11 is a flowchart showing processing to update the access counter according to the embodiment.

For example, the page table 18 shown in FIG. 10 is a table which is referenced by the administrator at 23:00. The storage device 4 records, as history, whether there is access to the page every two hours.

When the access history of the page 'RP01' of the real volume 'R01' is considered, it can be seen that the page 'RP01' has not been accessed in the time zones 0:00 to 02:00, 02:00 to 04:00, and 06:00 to 08:00. In this embodiment, in cases where there is no access, '1' is registered as the bits corresponding to the relevant time zones and, in cases where there is access, '0' is registered as the bits corresponding to the relevant time zones. Furthermore, it is clear that, currently at 23:00, the real page 'RP01' of the real volume 'R01' has not been accessed even once. In cases where there is no access even once by 0:00, '1' (no access) is registered as the left hand bit of the access history representing the time zone 22:00 to 0:00.

Meanwhile, it can be seen that, currently at 23:00, there have been sixteen instances of access to the real page 'RP02' of the real volume 'R00' from 22:00 to 23:00. In this case, '0' (no access) is registered as the right-hand bit of the access history indicating the time zone 22:00 to 0:00.

For the access history summary of the pool table 15, the logical AND of the access histories of all of the real pages RP contained in the pool P is output. In a certain predetermined time zone, if all of the bits of the access histories of all of the real pages RP contained in the pool P are '1', '1' is registered as the bits of the access history summary of the pool table 15. However, if all of the bits of the access histories are '1', '0' is registered as the bit of the access history summary. That is, only in cases where there is no access to any of the real pages RP contained in the pool P is '1' registered as the bit of the access history summary. In this embodiment, the logical AND of the access histories of all of the real pages RP contained in the pool P is output in each time zone as the access history summary. However, as long as the existence or non-existence of access to all of the real pages contained in the pool P in each time zone is clear, the determination of whether there is access is not limited only to a logical AND calculation.

(4) Processing to Update the Access Counter

Here, the processing to update the access counter of the page table 18 will be described using the flowchart of FIG. 11. The update processing is executed by the CPU 42 of the storage device 4 on the basis of the access history recording program 9.

First, the CPU 42 starts this update processing upon receipt of a read or write request for a real page RP. Further, when performing reading or writing on the real page RP, the CPU 42 increments the access counter 183 of the page table 18 corresponding with the real page RP (S1) and ends the processing. For example, 1 is added to the access counter.

Thus, when reading or writing is performed on an optional real volume R in a certain time zone, the access counter is incremented.

(5) Access History Recording Processing

Figure 12:
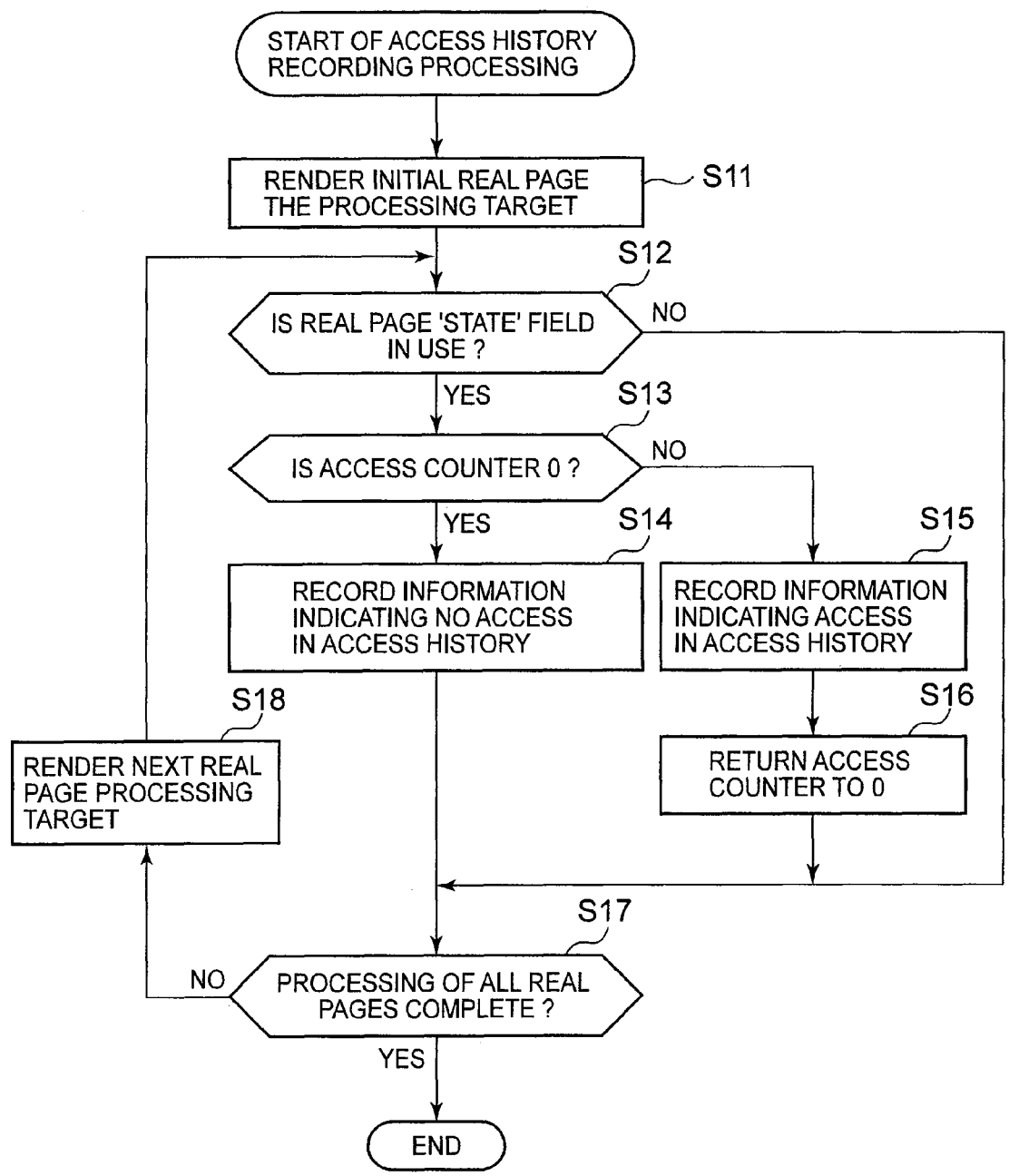
FIG. 12 is a flowchart showing processing to record the access history according to the embodiment.

The processing to record the access histories of the page table 18 will be described by using the flowchart in FIG. 12. As per the update processing, this processing is executed by the CPU 42 of the storage device 4 on the basis of the access history recording program 9.

First, the CPU 42 starts the processing at predetermined time intervals. In this embodiment, the CPU 42 starts the processing in two-hour intervals.

Upon establishing the initial real page RP of an optional real volume R as the processing target (S11), the CPU 42 judges whether the processing-target real page RP has been assigned to the virtual page VP of the virtual volume V, that is, whether the 'state' field of the real volume table 14 is in use (S12). In cases where the processing-target real page RP has been assigned to the virtual page VP of the virtual volume V (S12: YES), the CPU 42 judges whether the access counter continues to be zero (S13).

In cases where the access counter is zero (S13: YES), it is clear that the processing-target real page RP has not been accessed even once in two hours and the CPU 42 therefore records '1' which indicates no access as the bit representing the last two hours of the access history of the page table 18 (S14).

However, in cases where the access counter is not zero (S13: NO), it is clear that the processing-target real page RP has been accessed the corresponding number of times of the access counter in two hours and the CPU 42 therefore records '0' which indicates access as the bit representing the last two hours of the access history of the page table 18 (S15). Thereafter, the CPU 42 resets the access counter of the page table 18 by restoring the access counter to '0' (S16).

When the access history registration is complete, the CPU 42 then selects the real page RP constituting the processing target (S17: NO, S18) and performs the processing from steps S12 to S16. Upon recording the access history for all of the real pages RP of the optional real volume R (S17: YES), the CPU 42 then ends the processing.

(6) Real Page Migration Processing

Figure 13:
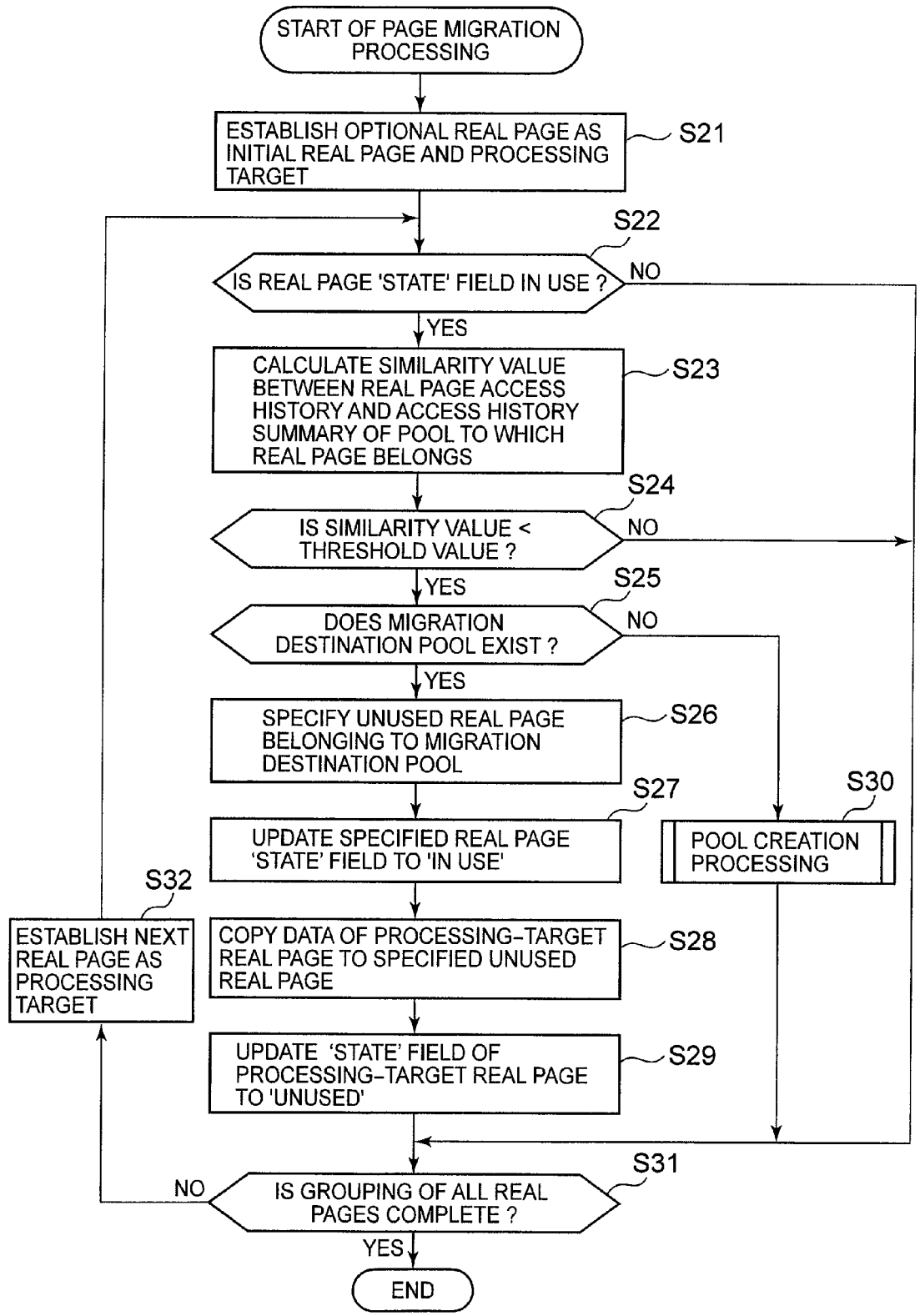
FIG. 13 is a flowchart showing page migration processing according to the embodiment.

Page migration processing, in which real pages RP whose access history is managed by the storage device 4 as described earlier are grouped into real pages with similar access or no-access time zones, will now be described by using FIG. 13. The page migration processing is executed by the CPU 42 of the storage device 4 at a predetermined interval on the basis of the page migration program 10. This interval is longer than the interval for the processing to record the access history. In this embodiment, the CPU 42 executes the page migration processing on a daily basis, for example.

When the initial real page RP of the optional real volume R is established as the processing target (S21), the CPU 42 judges whether the processing-target real page RP has been assigned to a virtual page VP of a virtual volume V, that is, whether the 'state' field 144 of the real volume table 14 is in use (S22). In cases where the processing-target real page RP has been assigned to a virtual page VP of a virtual volume V (S22: YES), the CPU 42 calculates the degree of similarity between the access history of the real page RP and the access history summary of the pool P to which the real page RP belongs (S23). More specifically, the CPU 42 calculates the logical AND of the access history of the real page RP (184 in FIG. 10) and the access history summary of the pool P to which the real page RP belongs (152 in FIG. 7). Based on the calculation result from the logical AND calculation, the CPU 42 takes the number of bits showing '1' in the calculation result as the similarity value. The CPU 42 calculates a similarity value in order to judge whether the processing-target real page RP may still belong to the pool P to which the real page RP currently belongs. The length of the time of access to the processing-target real page RP may serve as a judgment reference in the calculation of the similarity value and it may be judged whether the bit arrays of '0' and '1' are similar.

For example, suppose that the access history of the real page RP is '000011001111' and the access history summary of the pool P to which the real page RP belongs is '000010001111'. The result of the CPU 42 performing a bit calculation (logical AND) on the access history of the real page RP and the access history summary of the pool P to which the real page RP belongs is that the number of bits showing '1' is '5'. Here, the similarity value is '5'.

In cases where the calculated similarity value is less than a preset threshold value (S24: YES), because there is a low level of coincidence between a time zone in which there is no access to the processing-target real page RP and a time zone in which there is no access to the pool to which the real page RP currently belongs, the CPU 42 judges that it is necessary to move the processing-target real page RP to another pool P with a high level of coincidence between no-access time zones. The threshold value referred to here denotes a boundary value for judging the similarity between access time zones.

This threshold value is optionally set by the administrator.

For example, in cases where the threshold value is set at '8', since the similarity value '5' is less than the threshold value '8', the CPU 42 judges that the real page RP is a real page RP which must be migrated to another pool P.

The CPU 42 subsequently judges whether a migration destination pool P exists (S25). In other words, the CPU 42 calculates, using the same procedure as that of step S23, the similarity value between the access history of the processing-target real page RP and the access history summary of the other pool P and judges whether the calculated similarity value is equal to or more than the threshold value.

In cases where the migration-destination pool P does not exist (S25: NO), the CPU 42 executes pool creation processing (S30) and newly creates the migration destination pool P. The pool creation processing will be described subsequently. The CPU 42 continuously executes the processing of step S31 upon copying the data of the real page of the processing target to the migration-destination pool P created in step S30.

However, in cases where the migration destination pool P exists (S25: YES), the CPU 42 specifies an unused real page RP belonging to the migration destination pool P in order to migrate the real page RP to the migration destination pool P (S26). When picking up the real volume R belonging to the migration destination pool P by referencing the pool table 15, the CPU 42 references the page table 18 and searches for a real page RP for which the 'state' field 144 is 'unused' among the real pages RP constituting the picked up real volume R.

When an 'unused' real page RP is retrieved, the CPU 42 updates the 'state' field 144 of the retrieved real page RP from unused to 'in use' (S27).

Thereafter, when copying the data of the processing-target real page RP to the specified real page RP (S28), the CPU 42 updates the 'state' field 182 of the page table 18 corresponding to the processing-target real page RP from 'in use' to 'unused' (S29).

When establishing the next real page RP constituting the processing target (S31: NO, S32), the CPU 42 performs the processing from step S22 to step S30 with respect to the next real page RP. The CPU 42 then groups all of the real pages RP of the optional real volume R (S31: YES) and ends the processing.

In cases where the processing-target real page RP is unused in step S22 (S22: NO), the similarity value is equal to or more than the threshold value in step S24. Hence, in cases where there is no need to migrate the real page RP (S24: NO), the CPU 42 establishes the next real page RP as the processing target (S31: NO, S32).

Although one pool P is formed in correspondence with one or more RAID groups, the migration of the real-page data to another pool means that the data are stored in another RAID group holding access time zones that differ from the access time zones held by the pre-migration pool. Thus, the grouping of this embodiment is carried out for each pool.

In addition, although grouping is into real pages RP having similar no-access time zones in this embodiment, grouping may also be carried out for each real volume R having similar access time zones. In addition, although the threshold value denoted a boundary value for judging the level of coincidence of no-access time zones, the threshold value may also be a value permitting judgment of the level of coincidence of access patterns constituting access time zones or no-access time zones.

As mentioned earlier, by migrating the data of a real page RP to a pool P with a similar access time zone or a no-access time zone access pattern, data with similar access patterns can be saved in the same RAID group.

(7) Pool Creation Processing

Figure 14:
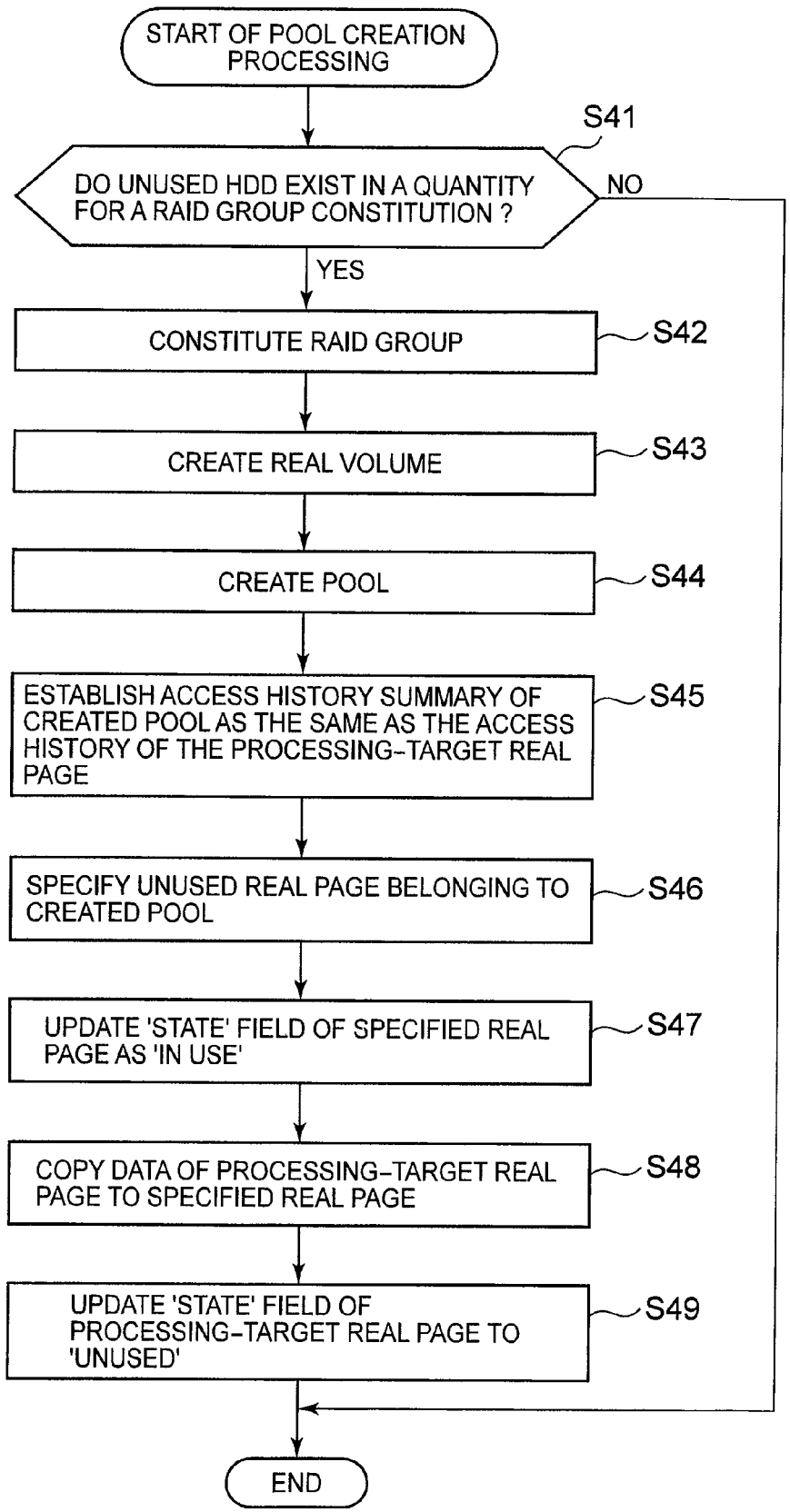
FIG. 14 is a flowchart showing pool creation processing according to the embodiment.

Subsequently, the pool creation processing of step S30 will be described by using the flowchart of FIG. 14. The pool creation processing is executed by the CPU 42 of the storage device 4 on the basis of the virtualization program 8. The CPU 42 starts the pool creation processing in cases where it is judged that the migration destination pool P does not exist.

The CPU 42 references the 'state' field 121 of the hard disk drive table 12 and, in cases where there are 'unused' hard disk drives HDD in a quantity allowing a RAID group to be constituted (S41: YES), a RAID group is newly formed by the 'unused' hard disk drives HDD (S42).

Further, the CPU 42 creates real volumes R from the storage area of the newly formed RAID group (S43) and creates a pool P from the created real volumes R (S44).

The CPU 42 establishes the access history summary of the created pool P with the same content as the access history of the processing-target real page RP (S45).

Thereafter, upon executing the processing from step S46 to step S49 by means of the same procedure as the processing from step S26 to step S29, the CPU 42 ends the pool creation processing.

(8) Processing to Update the Access History Summary

Figure 15:
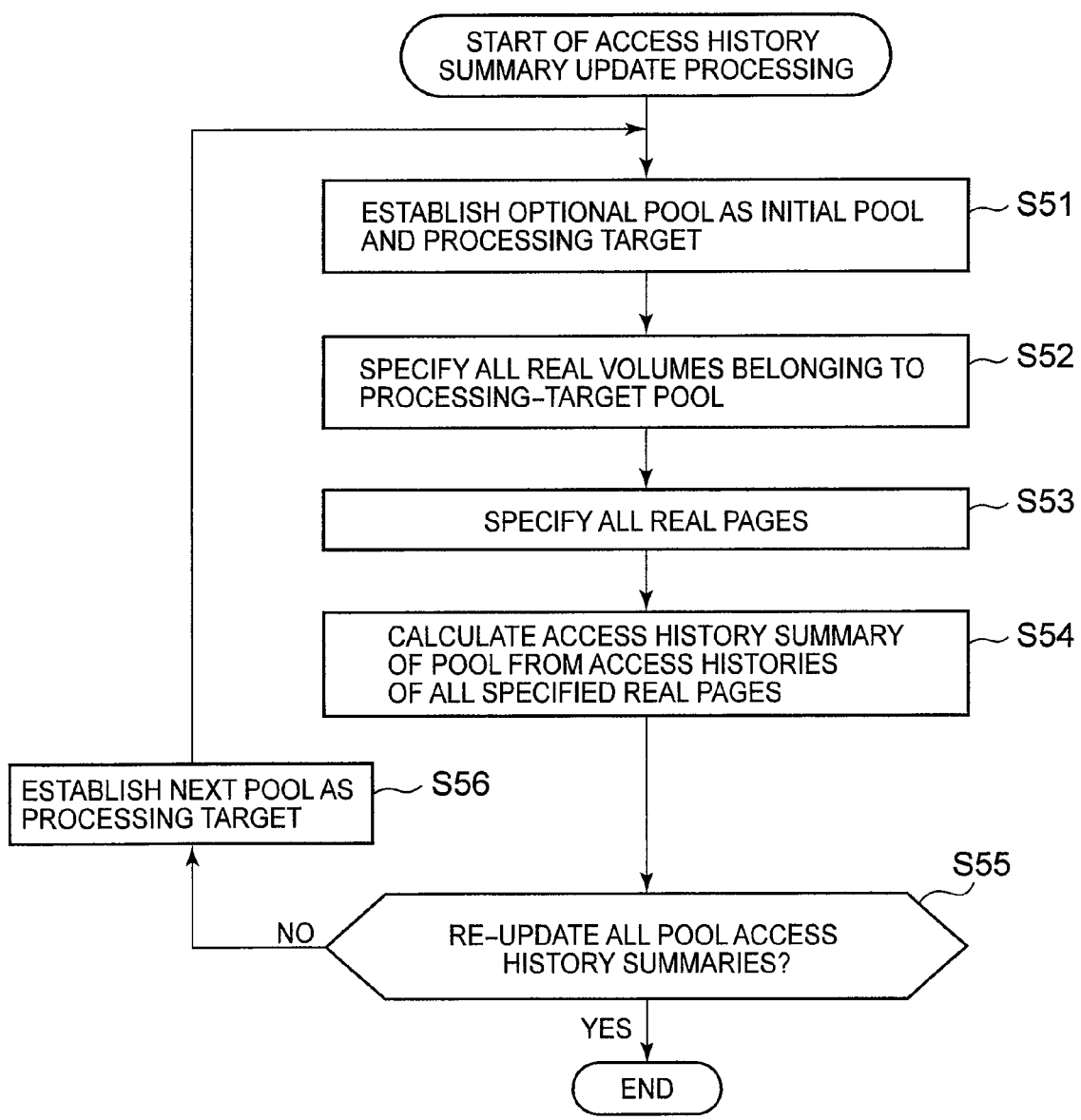
FIG. 15 is a flowchart showing processing to update the access history summary according to the embodiment.

The processing to update the access history summary of the pool table 15 will be described next by using the flowchart in FIG. 15. The update processing is executed by the CPU 42 of the storage device 4 at a predetermined interval on the basis of the access history recording program 9. This interval is longer than the interval for the access history recording processing. In this embodiment, the CPU 42 executes the update processing immediately before the real page migration processing on a daily basis, for example.

When the CPU 42 establishes an optional pool P as the initial pool P and as the processing target (S51), the CPU 42 references the pool table 15 and specifies all of the real volumes R belonging to the processing target pool P (S52). Subsequently, the CPU 42 references the page table 18 and specifies all of the real pages RP contained in the specified real volumes R (S53). The CPU 42 then calculates the access history summary of the pool P on the basis of the access histories of all of the specified real pages RP (S54). In this embodiment, as mentioned earlier, the logical AND of the access histories of all of the real pages RP contained in the pool P is output. In other words, if, in a certain predetermined time zone, all of the bits of the access histories of all of the real pages RP contained in the pool P are '1', '1' is registered as the bit of the access history summary of the pool table 15. However, if all of the bits of the access history are not '1', '0' is registered as the bit of the access history summary.

The CPU 42 repeatedly executes this processing until the access history summaries of all of the pools P are updated (S55: NO, S56) and ends the processing.

Thus, the storage device 4 is also able to create the pools P and update the access history summaries of the pools P as needed.

The access history summaries of the pool table 15 need not be updated. For example, if the access history summaries are calculated when creating the pool table 15 as described in step S45, the calculated access history summaries may also be fixed as initial values. Thus, a reduction in the access performance due to the processing to update the access history summaries can be prevented by not updating the access history summaries.

(9) Pool Creation Processing Based on Administrator Instructions

Pool creation can also be executed by the storage device 4 on the basis of instructions following the wishes of the administrator instead of being executed by the storage device 4 as mentioned earlier. FIG. 16 shows an example of a screen S1 of the management terminal 6 which is output when the administrator creates a pool P. The screen S1 is constituted by a pool ID field A1, a real volume field A2, an access history summary field A3, an OK button B1, and a Cancel button B2. The pool ID field A1 accepts a pool ID which is input by the administrator. The real volume ID field A2 displays all of the real volumes ID not belonging to the pool P. The administrator selects the real volumes ID constituting the pool P. The access history summary field A3 displays the existence or non-existence of access for each time zone. Time zones and radio buttons RB corresponding with the existence or non-existence of access for each time zone are disposed on screen S1. By checking the radio buttons RB for each time zone depending on whether there is access or not, the administrator is able to form the desired access time zone pattern for the pool P. In this screen example, the administrator wishes to create a pool P with which there is no access in the time zones 18:00 to 0:00 and 0:00 to 06:00.

When the administrator pushes the OK button B1, processing to create pool P with the desired content is started. In cases where pool P is created by means of an administrator instruction, the management terminal 6 transmits a creation instruction to the storage device 4 and, when the storage device 4 receives the creation instruction, the CPU 42 of the storage device 4 executes processing to create the pool P based on the virtualization program 8. In this case, the CPU 42 registers a pool ID, real volume IDs, and access history summaries which are designated via the pool creation screen in the pool table 15 and creates the pool P in accordance with the creation instruction.

It is thus possible for the administrator to create the pool P by designating access history summaries. In cases where the administrator instructs pool creation, the pool creation processing (FIG. 14) described hereinabove and the access history summary update processing (FIG. 15) described subsequently are not executed.

(10) Spindown Processing

Figure 17:
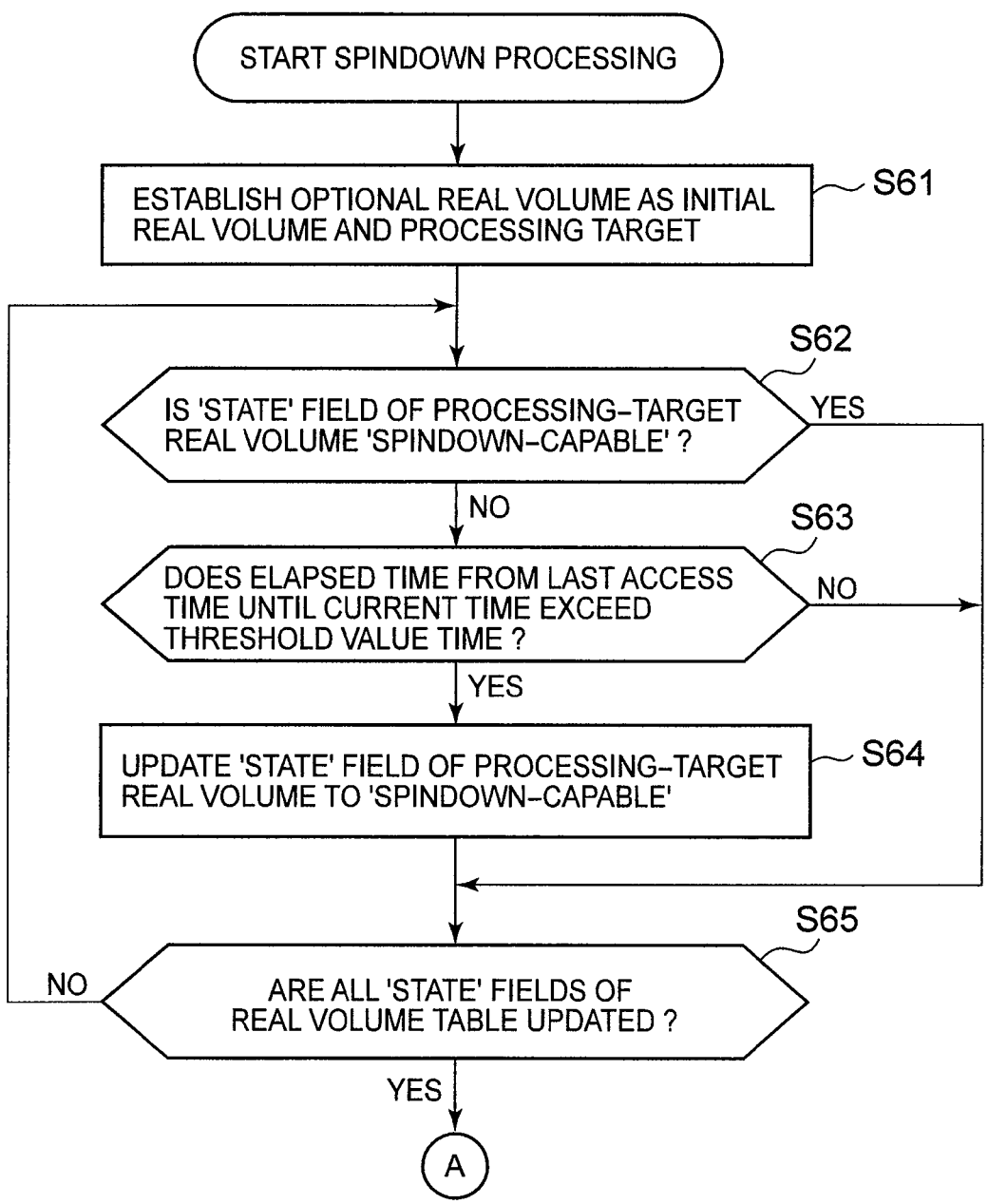
FIG. 17 is a flowchart showing spindown processing according to the embodiment.
Figure 18:
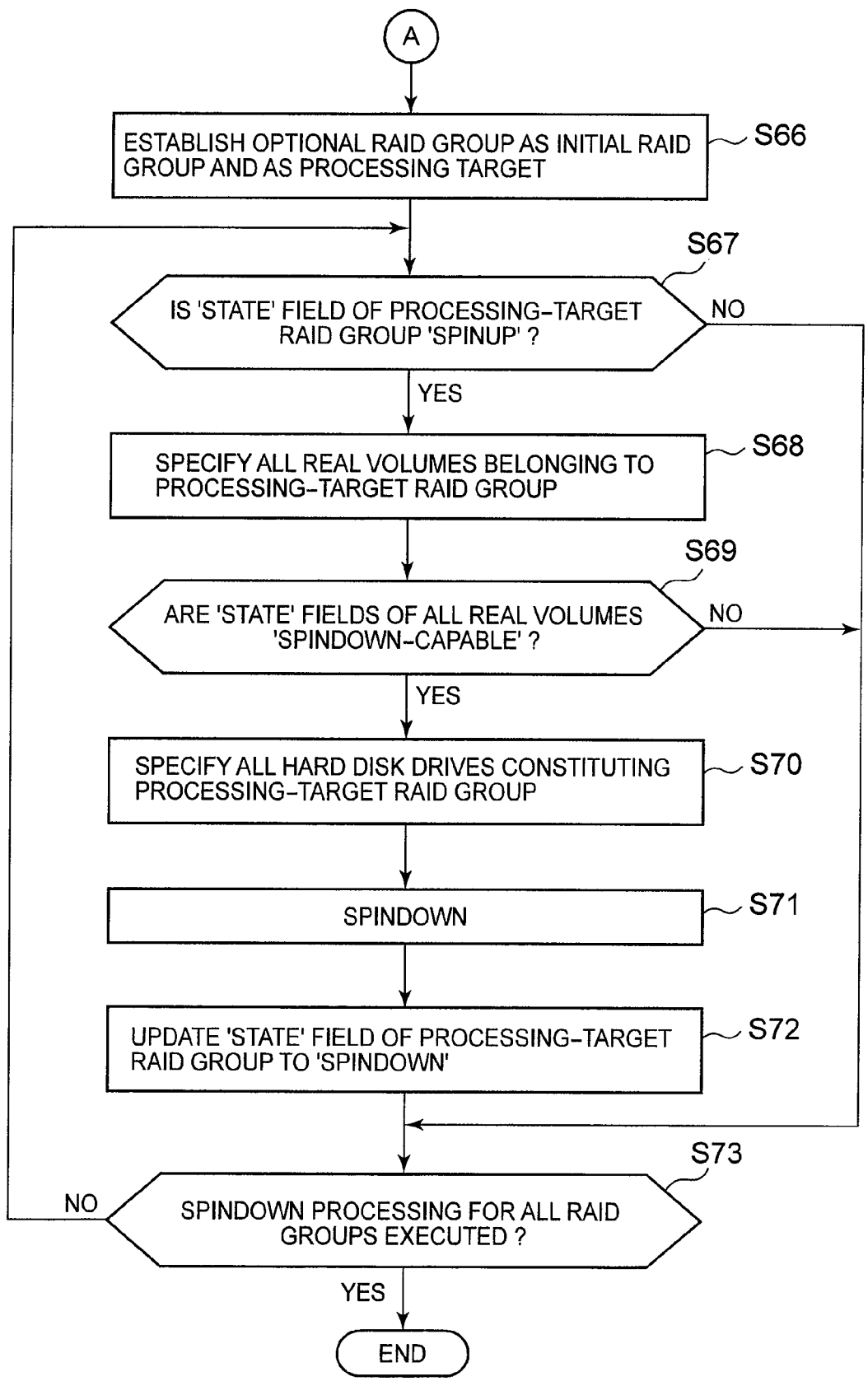
FIG. 18 is a flowchart showing spindown processing according to the embodiment.

The procedure involved in controlling grouped RAID groups from normal power to power savings will now be described by using the flowchart shown in FIGS. 17 and 18. The spindown processing shown in FIGS. 17 and 18 is processing of an example for performing control to reduce the electrical power amount of a RAID group or render the electrical power amount zero and is not limited to spindown. It is also possible to reduce the rotational speed of the disk or shut off the power supply to the whole hard disk drive. Spindown processing is executed by the CPU 42 of the storage device 4 at predetermined intervals on the basis of the HDD power control program 11. In this embodiment, the CPU 42 executes spindown processing every five minutes.

When establishing an optional real volume R as the initial real volume R and as the processing target (S61), the CPU 42 references the real volume table 14 and judges whether the 'state' field 144 of the processing-target real volume R is 'spindown-incapable' or 'spindown-capable' (S62).

In cases where the 'state' field 144 is spindown-incapable (S62: YES), the CPU 42 then references the 'last access time' field 143 and judges whether the elapsed time from the last access time to the current time exceeds a threshold value time (S63). The 'threshold value time' as it is used here is the boundary time determining whether the CPU 42 judges that power saving control may be carried out on the processing-target real volume. For example, supposing that the last access time is '0:00 Jan. 1, 2008', the current time is '0:10 Jan. 1, 2008', and the threshold value time has been set at 5 minutes, because the elapsed time '10 minutes' from the last access time to the current time exceeds the threshold value time '5 minutes', it is judged that the processing-target real volume is spindown-capable.

In cases where the elapsed time exceeds the threshold value time (S63: YES), it is clear that the processing-target real volume R has not been accessed for a little while. Hence, the CPU 42 updates the 'state' field 144 of the processing-target real volume R from 'spindown-incapable' to 'spindown-capable' (S64).

When executing this processing until the 'state' field 144 of the real volume table 14 has been updated for all of the real volumes R (S65), the CPU 42 establishes an optional RAID group as the initial RAID group and as the processing target (S66). The CPU 42 then references the RAID group table 13 and judges whether the 'state' field 132 of the processing-target RAID group is 'spinup' or 'spindown' (S67).

In cases where the 'state' field 132 is 'spinup' (S67: YES), the CPU 42 references the real volume table 14 and specifies all of the real volumes which belong to the processing-target RAID group (S68). If the 'state' field 144 of all of the specified real volumes R is 'spindown-capable' (S69: YES), the CPU 42 references the RAID group table 13 and specifies all of the hard disk drives constituting the processing-target RAID group (S70). Thus, supposing that the CPU 42 spins down all of the hard disk drives constituting the processing-target RAID group (S71), the CPU 42 updates the 'state' field 132 of the RAID group table 13 from 'spinup' to 'spindown' (S72).

The CPU 42 judges whether it is possible to spin down all of the RAID groups and, upon execution of spindown processing with respect to the spindown-capable RAID groups (S73), ends the processing.

In cases where the 'state' field 132 of a RAID group is 'spindown' (S67: NO) and where there is just one 'spindown-incapable' real volume in all of the specified 'state' fields 144 (S69: NO), spindown processing is not executed.

(11) Spinup Processing

Figure 19:
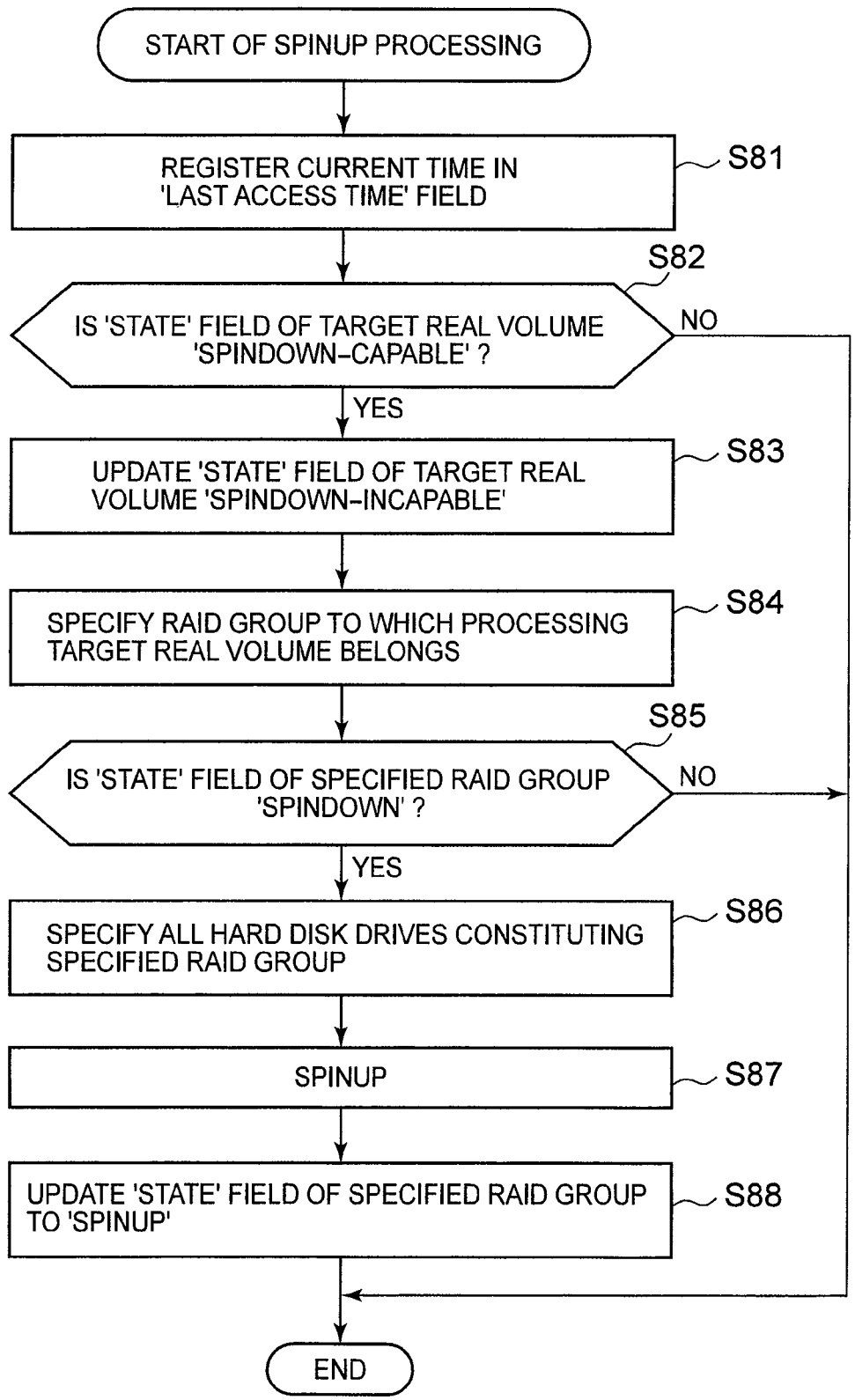
FIG. 19 is a flowchart showing spinup processing according to the embodiment.

Spinup processing so that the RAID groups on which power saving control has been performed by the spindown processing consume normal power will now be described by using the flowchart of FIG. 19. Spinup processing is executed by the CPU 42 of the storage device 4 on the basis of the HDD power control program 11.

The CPU 42 starts spinup processing in cases where a write request or read request for a real volume R is received.

Upon reading the real volume table 14, the CPU 42 registers the current time in the 'last access time' field 143 of the real volume R constituting the write request or read request target (S81). In cases where the 'state' field 144 of the real volume table 14 is 'spindown-capable' (S82: YES), the CPU 42 then updates the state field to 'spindown-incapable' (S83).

When the CPU 42 specifies the RAID group to which the real volume of the write request or read request target belongs from the 'RG ID' field 142 of the real volume table 14 (S84), the CPU 42 reads the 'state' field 132 of the RAID group table 13 corresponding to the specified RAID group. Further, if the 'state' field 132 of the RAID group table 13 is 'spindown' (S85: YES), the CPU 42 specifies all of the hard disk drives HDD constituting the specified RAID group from the RAID group table 13 (S86) and spin ups all of the specified hard disk drives HDD (S87). Thereafter, upon updating the 'state' field 132 of the RAID group table 13 from 'spindown' to 'spinup' (S88), the CPU 42 ends the processing.

In cases where the 'state' field 144 of the real volume table 14 is 'spindown-incapable' (S82: NO) and where the 'state' field 132 of the RAID group table 13 is 'spinup' (S85: NO), the CPU 42 does not need to execute spinup processing and therefore ends the processing.

As mentioned earlier, spindown or spinup can be executed for each RAID group in which data of similar temporal access patterns is stored.

(12) Management Screen

Figure 20:
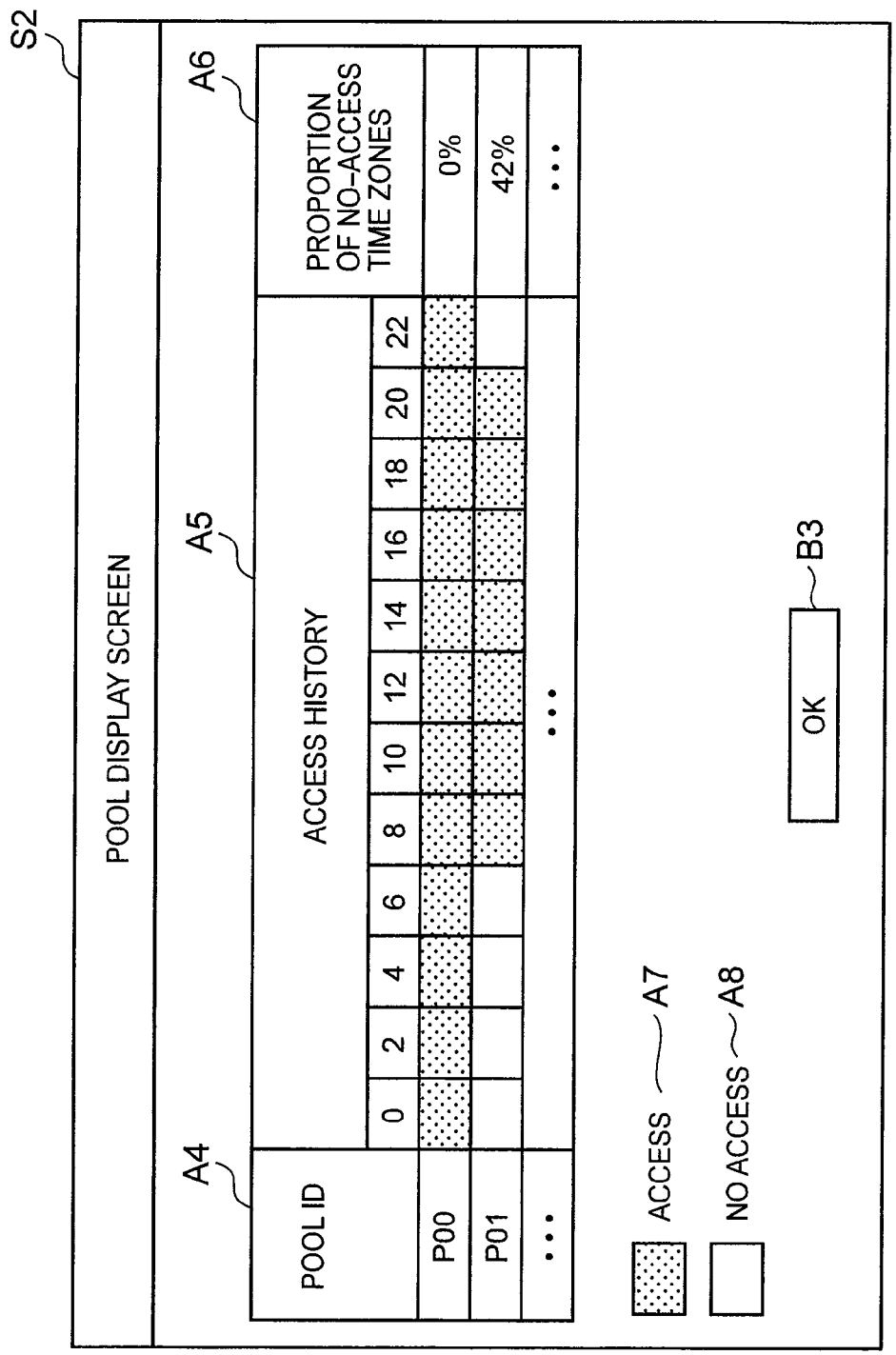
FIG. 20 shows a screen that visually illustrates the access history according to the embodiment.

Here, an aspect in which an access time zone pattern is visually displayed will be described using FIG. 20. FIG. 20 is an example of a screen S2 that visually displays an access history summary for each pool P. Screen S2 in FIG. 20 outputs a 'pool ID' A4, a 2-hour interval 'access history' A5, and 'proportion of no-access time zones' A6. The existence or non-existence of access according to this embodiment is indicated by showing 'access performed A7' with color and showing 'no access A8' without color. For example, it can be seen that pool 'P01' is constituted by real pages RP (real volumes R) in which data not accessed from 0:00 to 08:00 and 20:00 to 22:00 are saved. It is clear that the proportion of time zones which are not accessed in relation to real pages RP is '42%'. Thus, the administrator is able to confirm the access history summary of each pool. When the administrator pushes the 'OK' button B3 after confirming the access history summaries, screen S2 ends.

Figure 21:
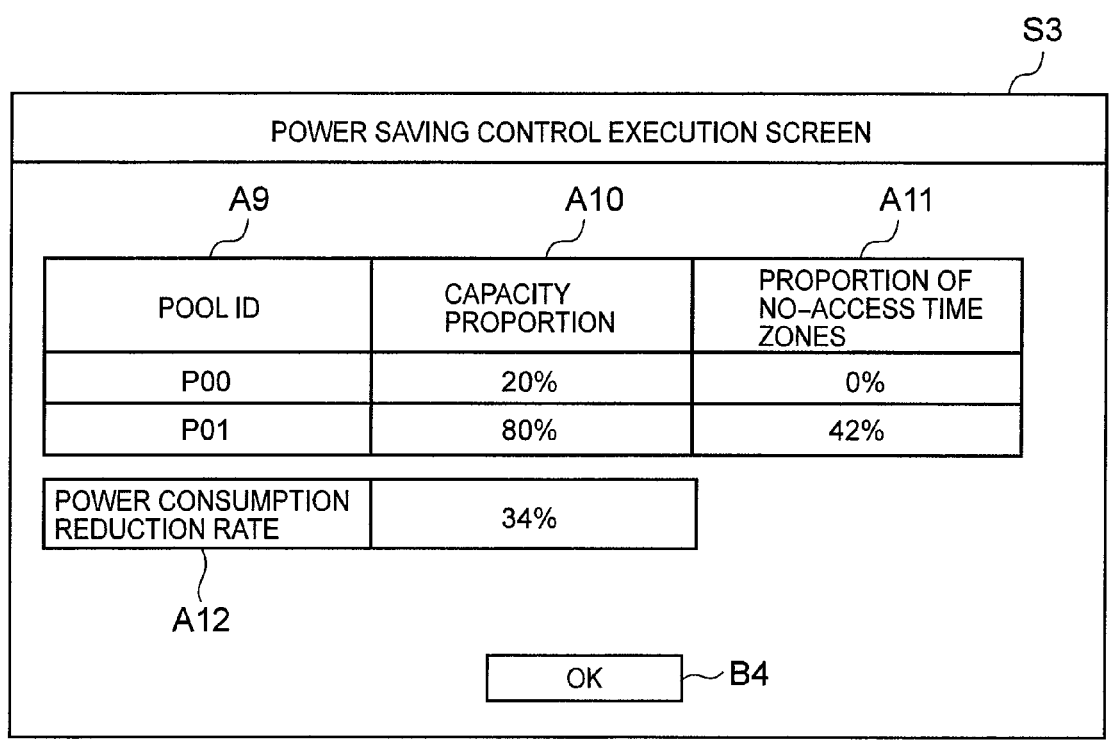
FIG. 21 shows a screen whereby power saving control is executed, according to the embodiment.

FIG. 21 is an example of a screen S3 that displays an aspect of reduced power consumption in cases where the storage device 4 executes control of power savings with respect to the RAID group. The administrator is able to confirm, from this screen, to what degree the power consumption can be reduced. A 'pool ID' A9, a 'capacity proportion' A10 indicating how much data is stored in the pool, a 'no-access time zone proportion' A11, and a 'power consumption reduction rate' A12 are output to the screen of FIG. 21. For example, because spindown is executed with respect to the RAID groups constituting the pool 'P01', the screen S3 in FIG. 21 shows that the power consumption can be reduced by '34%'. When the administrator pushes the 'OK' button after confirming this power consumption reduction, the screen ends.

(13) Effect of Embodiment

As mentioned earlier, this embodiment makes it possible to group data with similar access time zone access patterns and similar no-access time zone access patterns in the same RAID groups (pool areas). Hence, because the storage device lowers the rotational speed of the hard disk drive or stops the rotation of the hard disk drive in the no-access time zones, the storage device is able to reduce the power consumed.

(14) Further Embodiments

This embodiment assumes a storage device that assigns the storage capacity that is actually suitably used in real page units or the like when there is write access or the like to the virtual volume V, but the present invention is not limited to such a storage device. For example, the present invention can also be applied to a storage device in which virtual volumes are not present, and in which volumes (Logical Units (LU) or the like) are formed by a plurality of hard disk drives, and the volumes are provided to the host computer. A volume group is formed by a plurality of volumes.

That is, a history of access time zones that records access time zones and no-access time zones is managed for each volume. Furthermore, an access time zone history summary is managed by means of bit calculations or the like for each volume group. The access time zone history and access time zone history summary are compared and data are migrated to a similar volume in the volume group.

Moreover, in the above embodiment, the storage device executes spindown or spinup for each RAID group but is not limited to this format. For example, instead of spindown, the storage device may perform control so that the hard disk drives constituting the RAID groups operate using a smaller amount of power than the power that is used normally or may stop the power of the hard disk drives. The storage device may also perform control to reduce the rotational speed of the hard disk drives. In addition, the storage device may perform control to lower the power saving control mode sequentially in the order 'unload', 'spindown', and 'power OFF' in accordance with the elapsed time from the last access time to the current time. For example, in cases where the elapsed time is short, the storage device executes the small power saving control mode 'unload'. In cases where the elapsed time is long, the storage device executes the large power saving control mode 'power OFF'. The storage device may also execute spindown. In cases where there is no applicable power saving control mode, the storage device may execute spindown.

What is claimed is:

1. A storage device, comprising:
   a virtual volume that provides a virtual storage area for a host device;
   a first pool area including a plurality of first storage devices;
   a second pool area including a plurality of second storage devices; and
   a controller configured to:
   assign one or more first storage region belonging to the first pool area to the virtual volume in response to receiving a write request from the host device,
   monitor a time zone history indicating an existence or non-existence of access to the first pool area, the second pool area and the one or more first storage region assigned to the virtual volume in each time zone,
   calculate a first similarity value on the basis of a time zone history of access to the first storage region assigned to the virtual volume and a time zone history of access to the first pool area,
   calculate a second similarity value on the basis of the time zone history of access to the first storage region assigned to the virtual volume and a time zone history access to the second pool area, if the first similarity value is lower than a first predetermined value,
   migrate a data in the first storage region to a second storage region belonging to the second pool area if the second similarity value is higher than a second predetermined value, and
   spin down the plurality of second storage devices in case where a time zone of no access to the second pool area including the second storage region.

2. The storage device according to claim 1, wherein the controller configured to create a third pool area which holds the same access time zone history as the access time zone history for the first storage region in cases where a pool area for which the calculation result is similar to the access time zone of first storage region does not exist as a result of the comparison.

3. The storage device according to claim 2, wherein the controller calculate the first similarity value at predetermined time intervals.

4. The storage device according to claim 1, comprising:
   the plurality of first storage devices constituting one or a plurality of first RAID groups,
   wherein the first pool area includes any of the one or plurality of first RAID groups, and the other pool areas do not include the first RAID group included in the first pool area.

5. The storage device according to claim 1, wherein when the data stored in the second storage region belonging to the plurality of second storage devices is accessed from the host device, the rotational speed of the plurality of second storage devices constituting a second RAID group is raised to a prescribed value in RAID group units.

6. A storage device, comprising:
   a plurality of first volumes providing a storage area for access by a host device;
   a first volume group constituted by the plurality of first volumes;
   a plurality of second volumes providing a storage area for access by a host device;
   a second volume group constituted by group the plurality of second volumes; and
   a controller configured to:
   monitor a time zone history indicating an existence or non-existence of access to the first volume group, the second volume group and the one or more first volumes in each time zone,
   calculate a first similarity value on the basis of a time zone history of access to one of the plurality of first volumes and a time zone history of access to the first volume group, calculate a second similarity value on the basis of the time zone history of access to the one of the plurality of first volumes and a time zone history access to the second volume group, if the first similarity value is lower than a first predetermined value, migrate a data in the one of the plurality of first volumes to one of the plurality of second volumes belonging to the second volume group if the second similarity value is higher than a second predetermined value, and spin down the second volume group in case where a time zone of no access to the second volume group including the one of the plurality of second volumes.

7. The storage device according to claim 6, wherein the first volume group is constituted by volumes belonging to the same RAID group and the second volume group is constituted by volumes belonging to the same RAID group.

8. A power control method of a storage device including: a virtual volume providing a virtual storage area for access by a host device; a first pool area including a plurality of first storage devices; and a second pool area including a plurality of second storage devices, the power control method comprising the steps of:

assigning one or more first storage region belonging to the first pool area to the virtual volume in response to receiving a write request from the host device, monitoring a time zone history indicating an existence or non-existence of access to the first pool area, the second pool area and the one or more first storage region assigned to the virtual volume in each time zone, calculating a first similarity value on the basis of a time zone history of access to the first storage region assigned to the virtual volume and a time zone history of access to the first pool area, calculating a second similarity value on the basis of the time zone history of access to the first storage region assigned to the virtual volume and a time zone history access to the second pool area, if the first similarity value is lower than a first predetermined value, migrating a data in the first storage region to a second storage region belonging to the second pool area if the second similarity value is higher than a second predetermined value, and spinning down the plurality of second storage devices in case where a time zone of no access to the second pool area including the second storage region.

9. The power control method according to claim 8, further comprising the step of creating a third pool area that holds the same access time zone history as the access time zone history for the first storage region in cases where a pool area for which the calculation result is similar to the access time zone of the first storage region does not exist as a result of the comparison.

10. The power control method according to claim 9, wherein in the step of calculating the first similarity value at predetermined time intervals.

11. The power control method according to claim 8, wherein the plurality of first storage devices constituting one or a plurality of first RAID groups are provided, and the first pool area includes any of the one or plurality of first RAID groups, and the other pool areas do not include the first RAID group included in the first pool area.

12. The power control method according to claim 8, further comprising the step of raising the rotational speed of the plurality of second storage devices constituting a second RAID group to a prescribed value in RAID group units when the data stored in the second storage region belonging to the plurality of second storage devices is accessed from the host device.

13. A power control method of a storage device including:
a plurality of first volumes providing a storage area for access by a host device;
a first volume group constituted by the plurality of first volumes;
a plurality of second volumes providing a storage area for access by a host device;
a second volume group constituted by group the plurality of second volumes, the power control method comprising the steps of:
monitoring a time zone history indicating an existence or non-existence of access to the first volume group, the second volume group and the one or more first volumes in each time zone,
calculating a first similarity value on the basis of a time zone history of access to one of the plurality of first volumes and a time zone history of access to the first volume group,
calculating a second similarity value on the basis of the time zone history of access to the one of the plurality of first volumes and a time zone history access to the second volume group, if the first similarity value is lower than a first predetermined value,
migrating a data in the one of the plurality of first volumes to one of the plurality of second volumes belonging to the second volume group if the second similarity value is higher than a second predetermined value, and
spinning down the second volume group in case where a time zone of no access to the second volume group including the one of the plurality of second volumes.

14. The power control method according to claim 13, wherein the first volume group is constituted by volumes belonging to the same RAID group and the second volume group is constituted by volumes belonging to the same RAID group.

* * * * *